United States Patent [19]
Martin et al.

[11] Patent Number: 6,126,724
[45] Date of Patent: Oct. 3, 2000

[54] LOCOMOTIVE AIR PROCESSING APPARATUS

[75] Inventors: Shawn Martin, Sewickley; Stephen P. Dobies, Oakdale, both of Pa.

[73] Assignee: Hansen Inc., Pittsburgh, Pa.

[21] Appl. No.: 09/253,164

[22] Filed: Feb. 19, 1999

[51] Int. Cl.[7] .................................................. B01D 53/22
[52] U.S. Cl. ........................................... 96/4; 95/52; 96/8
[58] Field of Search ........................... 95/52; 96/4, 7–10

[56] References Cited

U.S. PATENT DOCUMENTS

| | | | |
|---|---|---|---|
| 4,640,773 | 2/1987 | Nishida et al. | 96/8 X |
| 4,883,023 | 11/1989 | Tsang et al. | 96/8 X |
| 5,211,728 | 5/1993 | Trimmer | 95/52 X |
| 5,240,472 | 8/1993 | Sircar | 95/52 |
| 5,282,964 | 2/1994 | Young et al. | 96/8 X |
| 5,470,379 | 11/1995 | Garrett | 96/8 X |
| 5,665,146 | 9/1997 | Mizobe | 96/7 |
| 5,681,368 | 10/1997 | Rahimzadeh | 95/52 X |
| 5,800,597 | 9/1998 | Perrotta et al. | 96/9 |
| 5,885,329 | 3/1999 | Hermann | 95/52 X |

FOREIGN PATENT DOCUMENTS

| | | | |
|---|---|---|---|
| 4039967 | 6/1992 | Germany | 96/7 |
| 63-240916 | 10/1988 | Japan | 96/7 |
| 1-236921 | 9/1989 | Japan | 96/7 |
| 3-186315 | 8/1991 | Japan | 96/8 |
| 5-137922 | 6/1993 | Japan | 96/8 |
| 6-134244 | 5/1994 | Japan | 96/8 |
| 6-134245 | 5/1994 | Japan | 96/8 |
| 6-134246 | 5/1994 | Japan | 96/8 |

*Primary Examiner*—Robert H. Spitzer
*Attorney, Agent, or Firm*—J. Stewart Brams

[57] ABSTRACT

An apparatus for utilizing semi-permeable membrane technology to process compressed air in such applications as a compressed air system of a railway locomotive.

15 Claims, 10 Drawing Sheets

LOCOMOTIVE AIR PROCESSING APPARATUS

BACKGROUND OF THE INVENTION

A conventional railway locomotive includes an onboard compressed air system for operation of pneumatically powered devices such as brakes, horns, sanders and shutters. The onboard compressed air system will include a compressor, an arrangement of filters and dryers to process the compressed air, one or more compressed air reservoirs, and suitable piping and valves to direct compressed air to the various pneumatically operated devices.

The compressed air output of a railway locomotive air compressor typically includes entrained water and oil which, if not removed from the compressed air, can contaminate pneumatically operated devices. The resulting corrosion, freeze-ups, and other degradations of pneumatic apparatus operation can have severe consequences. One prominent example is reduced braking reliability and deterioration or failure of brake valves. Moreover, if maintenance personnel use unsuitable additives to deal with the oil and water content of the compressed air, they may inadvertently exacerbate the very problems they seek to remedy.

The desiccant dryers commonly used to process onboard compressed air on locomotives have often proved inadequate to the task. Locomotive design practice imposes size and space limitations which permit use of only relatively small twin tower desiccant dryers. Since the air drying capacity of such dryers is related directly to desiccant tower size, the desiccant dryers a locomotive can accommodate often may be undersized. That is, the peak compressed air demand of a train and locomotive combination can exceed the air processing capacity of the most commonly available tower type desiccant dryer the locomotive can accommodate.

As an example of the unavoidable size and space limitations encountered, air drying and processing apparatus for a locomotive must interface between inlet and outlet connection flanges which are typically separated horizontally by only 13$^{13}$/$_{16}$ inches. An additional space limitation is that the dryer apparatus cannot interfere with locomotive truck swing movement. These and other such space limitations preclude use of desiccant dryers with sufficient desiccant surface area to ensure the compressed air demand of the train can always be met.

This invention relates to an apparatus for removing water vapor from compressed air in a railway locomotive. Specifically, permeable membrane media is used in combination with filter media in a novel apparatus to separate the various components of the compressed air gas mixture. A characteristic of permeable membranes is that, for a given pressure differential between the opposed sides of a given membrane, different gases will pass through or permeate the membrane at different rates. Thus, by using a membrane which exhibits a relatively higher water vapor permeation rate compared to its nitrogen or oxygen permeation rate, the water vapor component of a compressed air stream can be effectively removed from the air stream by the permeation process.

The pressure difference between the compressed air stream flowing along one side of the membrane, and the lower pressure on the opposed side of the membrane, drives the permeation process. Water vapor, as well as oxygen, nitrogen and other gases from the compressed air stream, will pass through the membrane at differing rates from the high pressure side to the low pressure side. For purposes of this invention, a membrane is chosen which allows permeation of water vapor at a rate sufficiently greater than that of nitrogen or oxygen to ensure that substantially all of the water vapor can be removed from the air stream with only relatively little loss of oxygen or nitrogen, the major gas components of the compressed air stream.

The present invention, in its preferred embodiment, thus contemplates a novel and improved apparatus which utilizes permeation gas separating technology for removing moisture from the onboard compressed air required for railway locomotive operation. The invention further contemplates single or multiple stage filtering apparatus used in conjunction with permeation technology for particulate and bulk liquid capture to remove oil and particulates from the compressed air stream.

The best mode of the invention comprises a modular assembly of elongated filter and membrane elements assembled in mutually parallel relationship between a pair of spaced apart manifolds. One manifold includes inlet and outlet connection flanges located for connection to the corresponding air line connection flanges of a railway locomotive. The invention provides an air drying apparatus of superior performance characteristics and capacity for the limited space envelope typically available onboard a railway locomotive.

In addition, the apparatus of the invention provides superior structural integrity to withstand the vibration, shock or impact loads, and inertial loading which are unavoidable in the railway locomotive operating environment.

It is therefore one object of the invention to provide novel and improved air drying for the compressed air generated onboard a railway locomotive.

Another object of the invention is to provide a modular assembly of air filtering and drying elements which are sized to fit within the confines of a railway locomotive space envelope provided for compressed air drying apparatus, but which nevertheless provide superior performance, durability, service life, and capacity over prior apparatus intended for the same purpose.

A more specific object of the invention is to provide a combination permeable membrane and filter assembly by confining elongated membrane and filter elements longitudinally between a pair of spaced apart manifolds, one of which manifolds also provides connection flanges for direct connection to the corresponding air line connection flanges of a railway locomotive.

These and other objects and further advantages of the invention will be more readily appreciated upon consideration of the following detailed description, and the accompanying drawings, in which:

Figure 1:
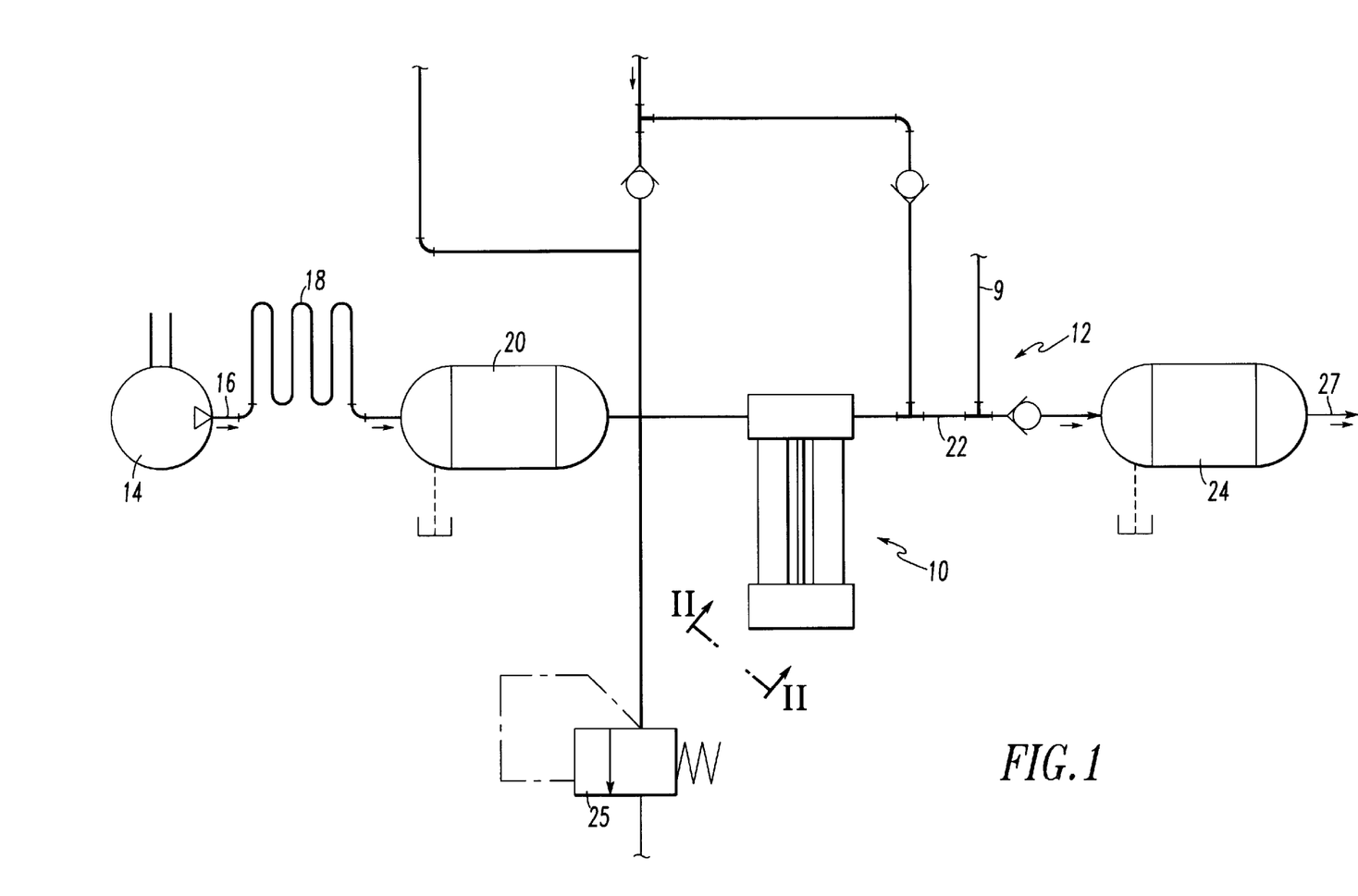
FIG. 1 is a schematic view of a railway locomotive compressed air system including an air dryer apparatus of the present invention.

There is generally indicated at 10 in FIG. 1 a dryer for drying onboard compressed air in a railway locomotive compressed air system generally indicated at 12.

Compressed air system 12 may typically include a compressor 14 which generates compressed air that is then passed via piping 16 to a cooling apparatus 18, and then to a main reservoir 20. From the reservoir 20, the compressed air is processed through dryer apparatus 10 and then is directed to any of a variety of pneumatically powered apparatus via supply lines 22 and connected air lines such as a brake line 27 and a locomotive supply line 29. The compressed air system downstream of dryer apparatus 10 may also include such expedients as a second reservoir 24, a safety relief valve 25 and any other compressed air supply system component suited for use with railway locomotives and train operations generally.

The dryer 10 comprises an assembly of components including a plurality of membrane tubes 28. Permeation separation media and techniques are well known, and some general background information on permeable membrane media thus will suffice for purposes of this application. The reader is referred to the relevant art for further details of permeation gas separation technology.

The membrane tubes 28 may comprise, for example, a cylindrical, impermeable exterior casing 29 having semi-permeable membrane media extending longitudinally therein. The membrane material takes the form of long, hollow tubes, commonly called fibers, which have a very small diameter. Thousands of these fibers are formed into a bundle, and the bundle extends within the impermeable exterior casing 29. The opposite ends of the hollow fibers protrude through epoxy barriers, located at the opposed ends, respectively, of casing 29, so that compressed air introduced to the open ends of a tube 28 passes through the interior of the hollow fibers, while the space within the membrane tube 28, but outside of the hollow fibers, is maintained at a lower pressure. Thus, the various gas components of the compressed air permeate the membrane fibers at different rates under the impetus of the pressure differential between the compressed gas within the fibers, and the reduced pressure, for example atmospheric pressure, externally of the fibers. For this invention, the selected membrane will have a relatively high water vapor permeation rate and a much lower permeation rate for nitrogen and oxygen. Hence, as compressed gas passes along the length of the tube 28 within the hollow membrane fibers, a small amount of nitrogen and oxygen, and most of the water vapor, will permeate through the membrane and escape to the low pressure side of the membrane fibers within casing 29.

The adequacy of water vapor removal by this mechanism will depend upon a number of factors, including but not limited to the degree of prefiltration, the specific permeation characteristic of the membrane medium itself, the pressure differential between the inside and the outside of the membrane fibers, and the residence time of the compressed air within the membrane fiber tubes. It has been found that suitable membrane material is available, and that suitable pressure differentials and residence time can be achieved, to supply dry compressed air to an operating train on a continuing basis. This is achieved utilizing a permeable membrane dryer apparatus such as that to be described which is sized to fit within the space limitations of a locomotive. Although it is conceivable other forms of drying media known or heretofore unknown may provide a satisfactory drying function in the described drying apparatus, semi-permeable membrane tube assemblies are the presently preferred drying medium.

Figure 2:
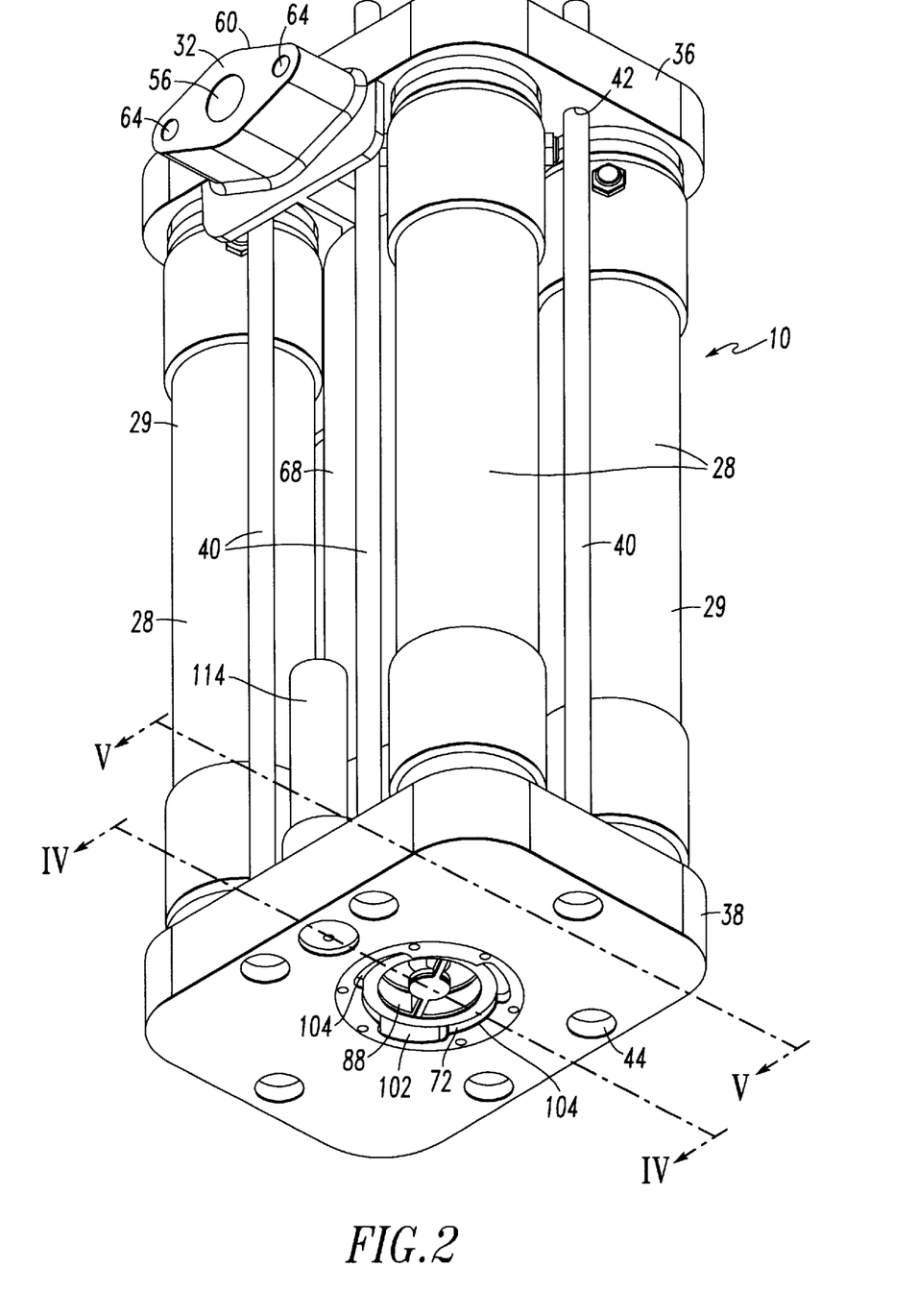
FIG. 2 is a perspective view from the vantage point of line II—II in FIG. 1, showing one presently preferred embodiment of the air dryer of this invention.
Figure 3:
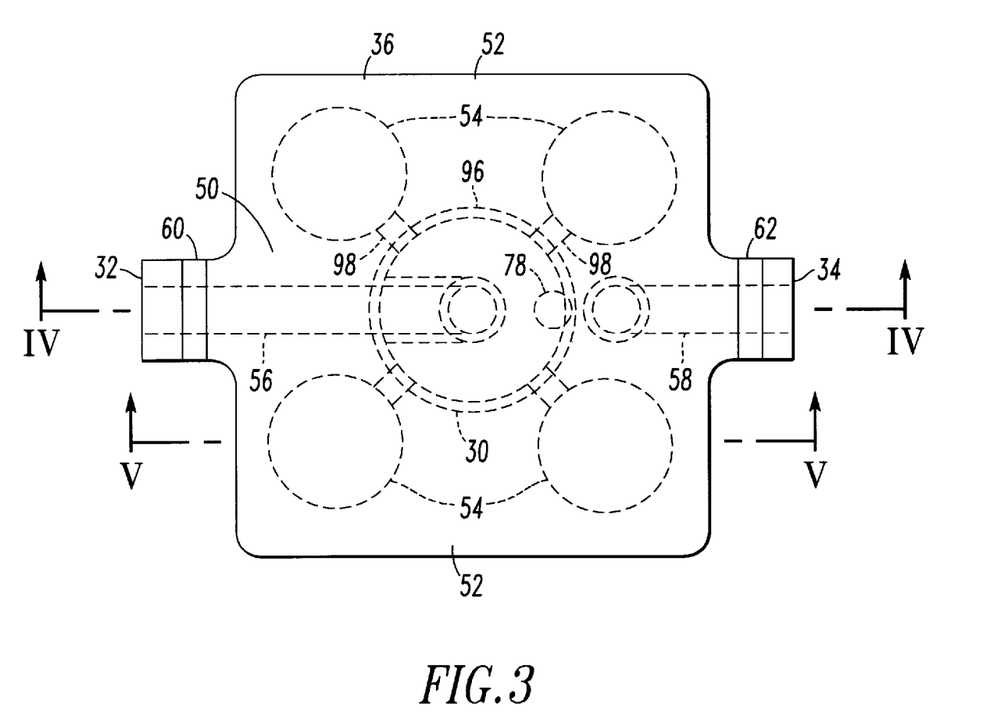
FIG. 3 is a top plan view of the air dryer of FIG. 2 with external details removed to clearly show the internal passages indicated by phantom lines.

As shown in FIGS. 2 to 5, dryer 10 comprises a filter assembly 26 through which the compressed air passes prior to its being directed through the elongated semi-permeable membrane tubes 28 arranged in parallel relationship and extending between a pair of manifolds 36 and 38 which include the necessary flow passages 30 (e.g., as in FIG. 3) for directing the compressed air from an inlet 32 through filter assembly 26 and membrane tubes 28, and thence to an outlet 34. FIG. 2 shows dryer apparatus 10 with its outer casing or housing removed to reveal an assembly comprised of upper manifold 36, lower manifold 38, and the elongated membrane tubes 28 captured between manifolds 36 and 38. The manifolds 36 and 38 may be of cast and machined metal of suitable physical properties, for example.

To retain the apparatus 10 in its assembled state, elongated tie rods 40 extend longitudinally between manifolds 36 and 38, each passing through respective bores 42 and 44 in respective manifolds 36 and 38. The tie rods 40 may be elongated threaded bolts, for example, having threaded nuts (not shown) received on the threaded end thereof, whereby dryer 10 can be secured to a mounting bracket (not shown) with manifolds 36 and 38 clamped together and all remaining assembly components captured therebetween.

Upper manifold 36 includes a main body portion 50 and a pair of side portions 52 extending to either side of body portion 50. Each of side portions 52 includes a pair of pockets 54 to receive the upper ends of a respective pair of membrane tubes 28, while body portion 50 includes inlet and outlet compressed air flow passages 56 and 58, respectively, which communicate with the inlet 32 and outlet 34, respectively, of manifold 36.

Adjacent the inlet 32 and outlet 34 are respective flanges 60 and 62 which mate with corresponding locomotive air line connection flanges (not shown) that are typically spaced a uniform $13^{13}/_{16}$ inches apart. The distance between flanges 60 and 62 is such as to provide for ready mating and connection of flanges 60 and 62 with the locomotive air lines. To make such connections, fasteners such as threaded bolts may be inserted through bores in the locomotive air line connection flanges and into corresponding threaded bores in flanges 60 and 62, such as bores 64 in flange 60 for example (FIG. 2).

Upper manifold 36 further includes a generally centrally located pocket 66 (FIG. 4) which receives one end of filter assembly 26 and lower manifold 38 includes a corresponding pocket 67 which receives the lower end of assembly 26. The pockets 66 and 67 and the space 76 extending axially between them are enclosed within a rigid compression tube 68 which extends between and compressively engages manifolds 36 and 38 under the clamping action of tie rods 40.

Figure 4:
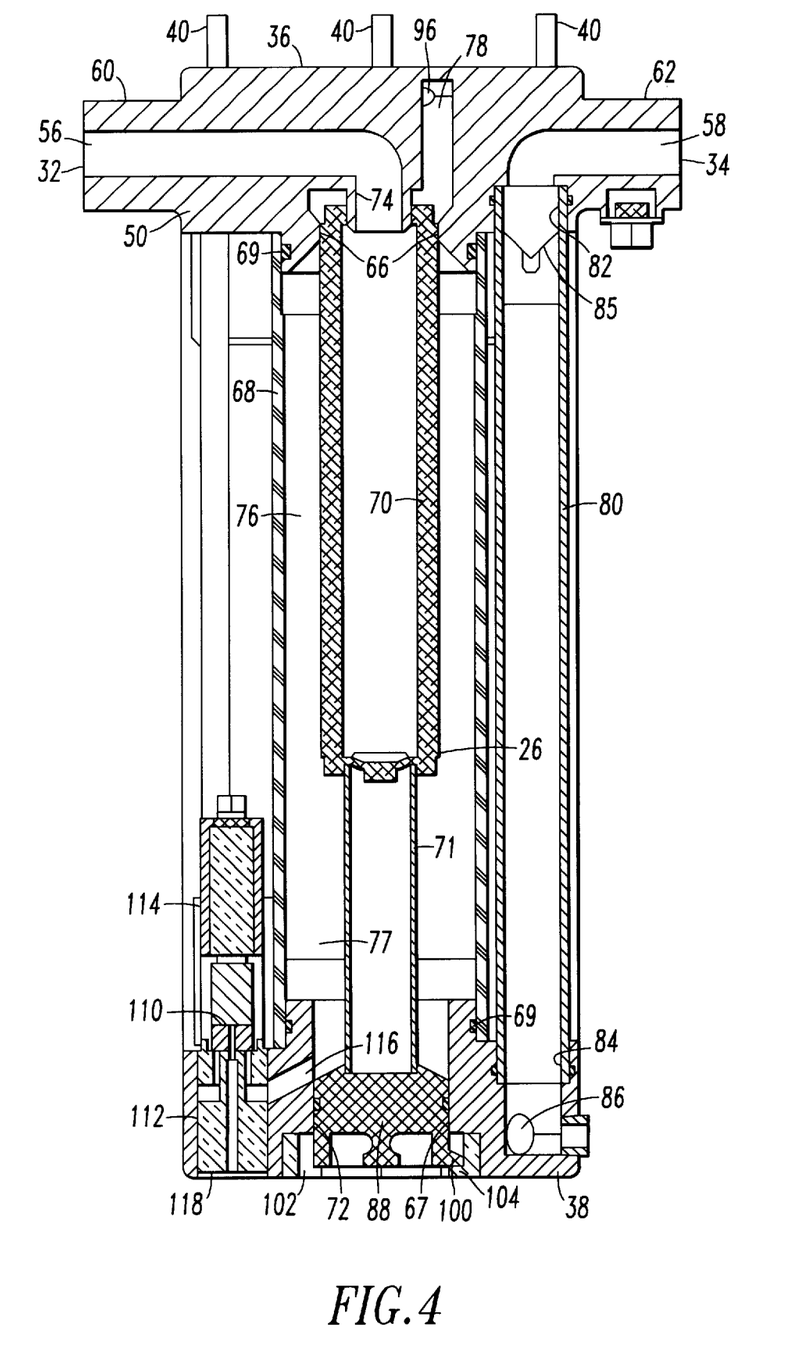
FIG. 4 is a sectional view taken on lines IV—IV of FIG. 2 or 3.

Compression tube 68 contributes to the dryer assembly as both a part of the compressed air flow passage system, and as a structural element. The compression tube 68 engages each of manifolds 36 and 38 in sealed engagement by means of internal O-rings 69. The axial ends of compression tube 68 seat solidly against manifolds 36 and 38 under compression loading applied by tie rods 40, thereby maintaining a fixed distance between the manifolds 36 and 38 and allowing the membrane tubes 28 to be captured between the manifolds without their bearing any significant axial loads. The large diameter of compression tube 28 also provides considerable flexural rigidity to the assembly, thus preventing load difficulties with the mass of lower manifold 38, which could otherwise result from shock, vibration and inertial loading. It is important that the overall structure address these modes of loading because the lower manifold is suspended a considerable distance from the dryer assembly mounting point.

Filter assembly 26 includes an elongated, cylindrical filter element 70, a filter support 71 fixed coaxially to the lower end of filter 70, and a tabbed cap 88 fixed to the lower end of support 71. The entire assembly 26 is received through a bottom opening 72 of pocket 67 such that the upper end of filter 70 projects over and sealingly engages a downwardly extending compressed air inlet pipe 74 disposed coaxially within space 76 at its upper end. Pipe 74 thereby conveys compressed air entering dryer 10 via inlet passage 56 into filter 70. The upper end of filter 70 is of suitable size and geometry for cooperation with a guide such as a plurality of tapering fins 66 to guide the filter 70 into engagement with air inlet pipe 74 upon insertion of the filter assembly 26 into the apparatus.

To retain assembly 26 within the apparatus as described, cap 88 is provided with a plurality of circumferentially spaced tabs 100 which are cooperable with corresponding grooves 102 formed in the perimeter of lower manifold opening 72, as shown in FIGS. 2 and 4. Once tabs 100 are positioned within the cooperating grooves 102, the cap 88 is rotated to move tabs 100 into engagement behind cooperating tabs 104 of opening 72 to thereby secure cap 88 somewhat in the manner of a bayonet lock.

Thus, the described filter assembly retention structure may also include an axial offset such that cap 88 must be pushed axially upward to disengage its tabs 100 from the corresponding tabs 102 of opening 72 prior to rotating cap 88 to its unlocked position. When locked in place, the cap 88 thus cannot rotate to the release position unless moved axially upward. Since assembly 26 resides within space 76, which is pressurized by the compressed air being processed, the internal air pressure will bear down on cap 88 and prevent it from being pushed axially upward for unlocking and removal when the system is in operation.

The described filter assembly allows for easy and efficient filter replacement. An additional feature of the filter assembly 26, among others to be discussed in more detail herein, is that the elongated support 71 provides sufficient spacing between the filter 70 and the lower regions of the space 76 to provide a gravity collection chamber 77 spaced vertically from the filter element 70 for condensate collection.

Condensate is drained from space 77 by a drain assembly 110 that is housed in a vertically extending through bore 112 formed in manifold 38, and a cylindrical housing 114 which extends coaxially upward from bore 112. A passage 116 communicates between space 77 and bore 112, sloping downward to provide gravity drainage from space 77.

The drain assembly comprises a solenoid valve and valve body, a recycling timed relay, a heater cartridge to prevent condensate freezing, and suitable power connections for the relay and heater. These are assembled as a unit, disposed in bore 112 and housing 114, and retained by a snap ring 118 that is accessible through the lower end of bore 112.

All components of the drain assembly 110 are coaxially aligned and have maximum transverse dimensions smaller than the diameter of bore 112. Thus, the entire drain assembly 110 can be removed and replaced through the lower end of bore 112. On actuation of the drain valve assembly 110 at preselected intervals, the collected condensate flows via passage 116 and the open valve and passes from the dryer apparatus.

Filter 70 preferably is comprised of randomly positioned fibers of glass, cotton, cellulose and/or polypropylene. Particulates are captured within the filter bed as the compressed air admitted via inlet pipe 74 passes downwardly in filter 70 and then radially outward through filter 70 to the space 76. Preferably, the filter fibers may be impregnated with an epoxy coating which functions as a binder to form a stable filter media structure. Filter 70 may be a dual-function filter for both particulate and aerosol capture. Alternatively, these functions may be provided by separate filter elements, as in the further preferred embodiment described hereinbelow. From the space 76, the filtered, compressed air passes upwardly within compression tube 68 into upper manifold 36 via a blind bore 78, as shown in FIG. 4, for distribution to the membrane tubes 28, as is described hereinbelow. Gaps (not shown) are provided between fins 66 to allow the filtered, compressed air to reach bore 78 from space 76.

Further shown in FIG. 4 is a an open-ended return pipe 80 which extends between manifolds 36 and 38, and the ends of which are received within respective pockets 82 and 84 of the manifolds 36 and 38. The upper end of pipe 80 communicates via a check valve 85 with outlet passage 58 and the lower end thereof communicates with a formed passage 86 in lower manifold 38. Passage 86 accommodates the flow of dry air from the lower ends of tubes 28 into pipe 80 through a network of passages formed in manifold 38 as described hereinbelow.

Of course, it is to be understood that all elements thus far described, as well as those described below, which mate with manifolds 36 and 38 in fluid or gas flow relation include suitable seals such as O-ring seals or the like to preclude fluid leakage at the interfaces between such flow sustaining elements and the manifolds 36 and 38.

Figure 5:
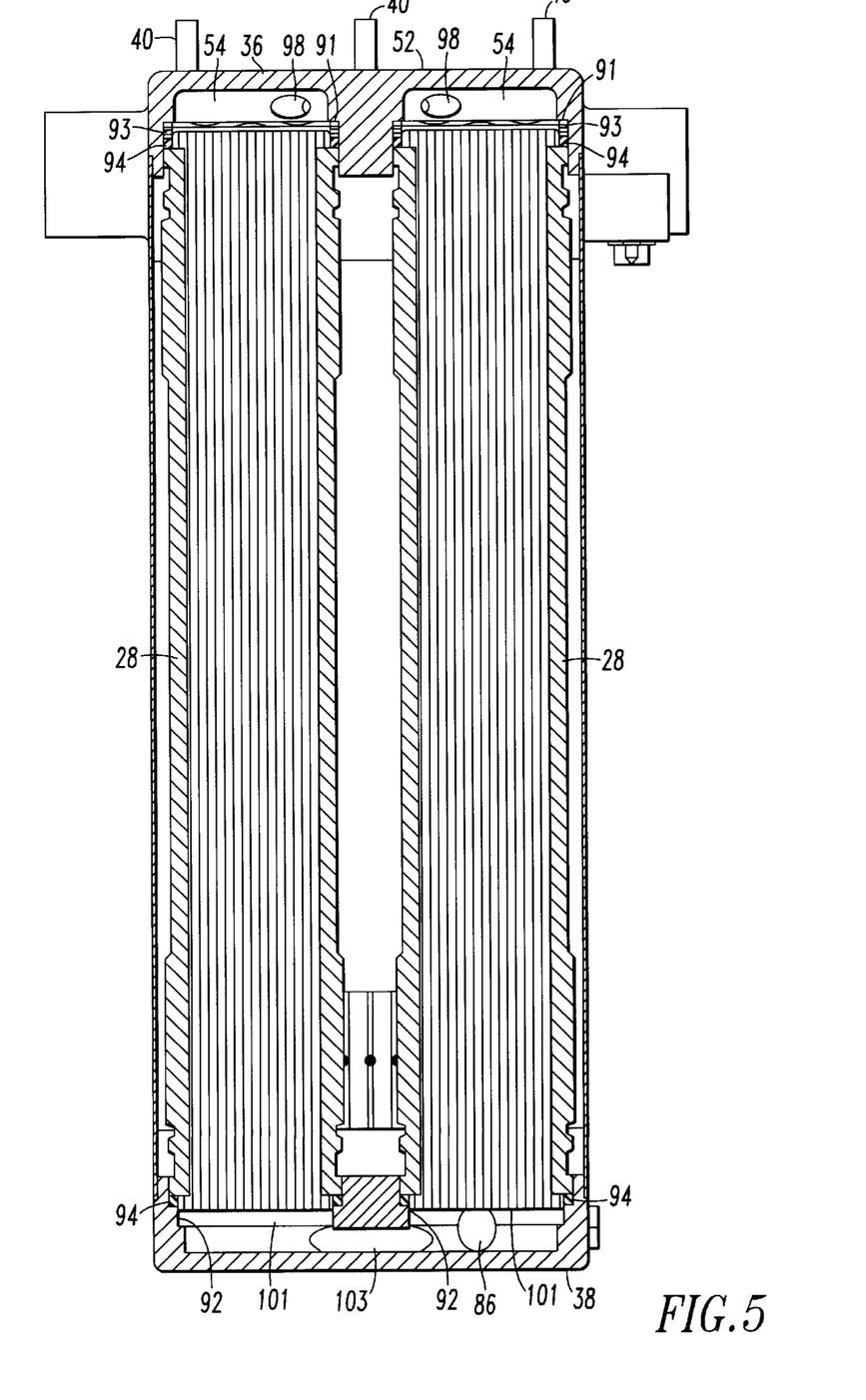
FIG. 5 is a sectional view taken on lines V—V of FIG. 2 or 3.

Referring to FIG. 5, the assembly of membrane tubes 28 to manifolds 36 and 38 is shown. The opposed ends of each tube 28 are received within respective pairs of pockets 54 and 92 in manifolds 36 and 38, and suitable O-ring seals 94 are provided to seal the interface between tubes 28 and the respective manifolds 36 and 38.

As noted above, compression tube 68 carries the compressive forces of the clamping action of tie rods 40 on manifolds 36 and 38. Accordingly, the axial spacing between manifolds 36 and 38, and the axial length of membrane tubes 28, are selected to permit the membrane tubes 28 to engage the manifolds 36 and 38 in sealed but non-load bearing relationship whereby the membrane tubes 28 carry no axial compressive loads.

More specifically, in lower manifold 38, the membrane tubes 28 are retained in sealed engagement within respective pockets 92, the sealing being provided by O-ring seals 94, In upper manifold 36, the membrane tubes 28 do not extend fully into respective pockets 54 and a small axial gap thus remains between the upper end of each membrane tube 28 and an annular shoulder 91 of pocket 54. Disposed in this axially extending gap is a wave spring and backup ring assembly 93, or other suitable biasing means, which exerts an axial force between shoulder 91 of pocket 54 and the O-ring seal 94 which seals between membrane tube 28 and the pocket 54.

The biasing means 93 serves to keep the O-ring seal 94 properly seated, and also allows for differential thermal expansion and contraction which can occur between the membrane tubes 28 on the one hand, and the compression tube 68 and tie rods 40 on the other. The clearances provided and the wave spring geometry and size are selected to ensure that the wave spring will neither fully unload nor fully compress under normal operating conditions. If the wave spring were to fully unload, the membrane tube seals could unseat, and if the wave spring were to compress to a solid condition, the membrane tubes would be subjected to axial structural loads. The performance characteristics of the biasing means 93 are preferably also selected to limit membrane tube bouncing and other undesirable movement when exposed to inertial forces.

The compressed air from the filter 70 then proceeds via space 76 and blind bore 78 to an annular passage 96 (FIGS. 3 and 4) which intersects bore 78, thence through connecting radial passages 98 to pockets 54, and thence to the upper ends of tubes 28. As the tubes 28 are arranged in parallel relationship, the compressed air flow from filter 70 is split into four streams which proceed simultaneously in a downward direction through the tubes 28. The compressed air passes into the hollow fibers of the permeable membrane medium. Water vapor permeates through the membrane medium and is thus eliminated from the compressed air stream, which exits the membrane fibers at their lower or outlet ends such as indicated at 101 in FIG. 5. The water vapor is vented from the membrane tubes 28 via suitable vent openings (not shown) in casings 29. A network of flow passages, designated 103 in FIG. 5, connects the outlet ends 101 of tubes 28 to passage 86 whereby the dry compressed air stream flows via passage 86, upward in pipe 80 to passage 58, and then to outlet 34, which is connected to the compressed air system of the train.

Another presently preferred embodiment of the invention is shown in FIGS. 6–12, which illustrate a dryer apparatus 10' having all of the salient features of the dryer apparatus 10 described hereinabove, with corresponding elements indicated by like numerals primed. Accordingly, the entire disclosure presented heretofore is hereby repeated by reference. Relevant differences between the FIGS. 1–5 embodiment and the FIGS. 6–12 embodiment will be discussed below.

Figure 6:
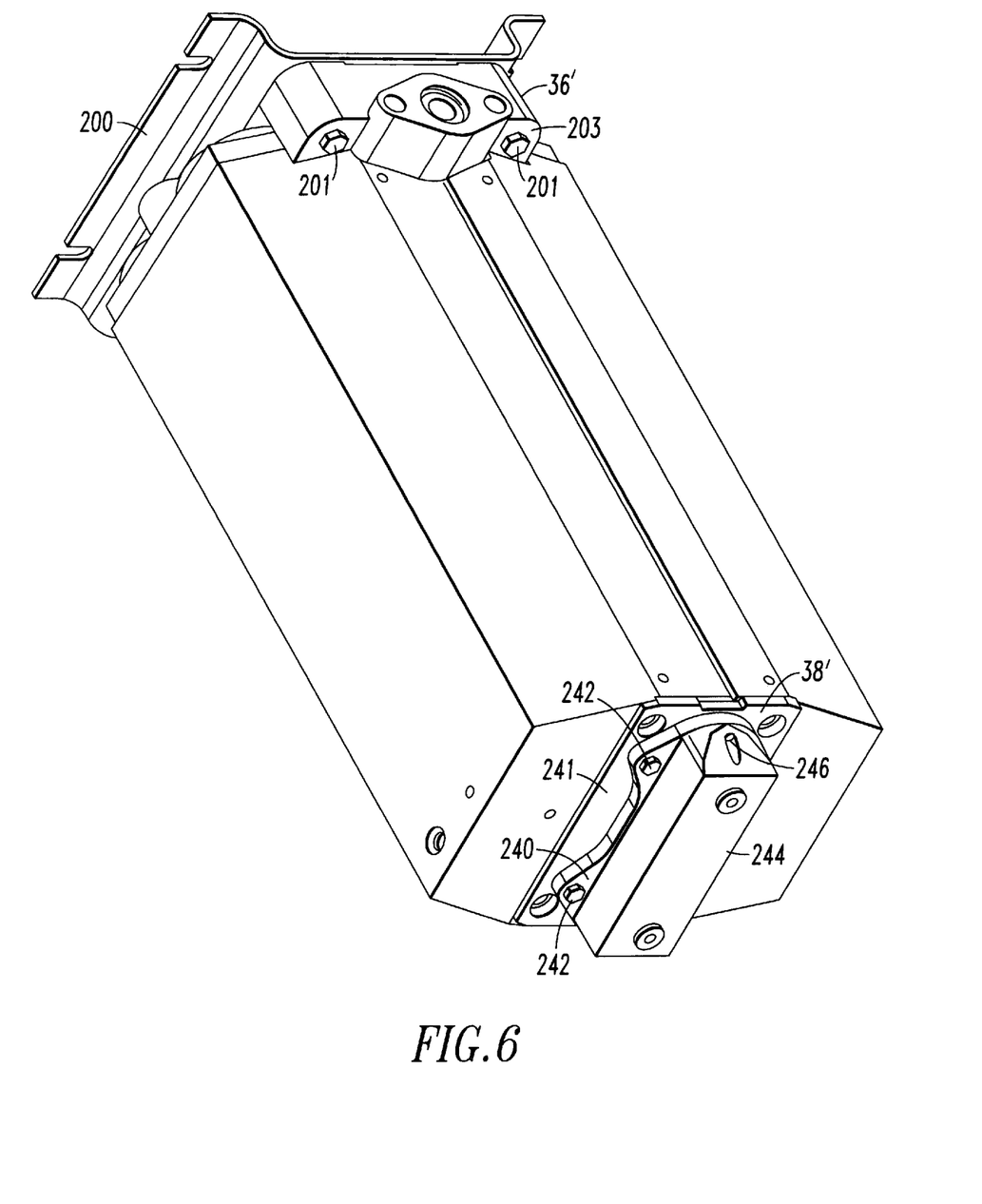
FIG. 6 is a perspective view of another presently preferred embodiment of the invention, various aspects of which are also shown in FIGS. 7–12.
Figure 7:
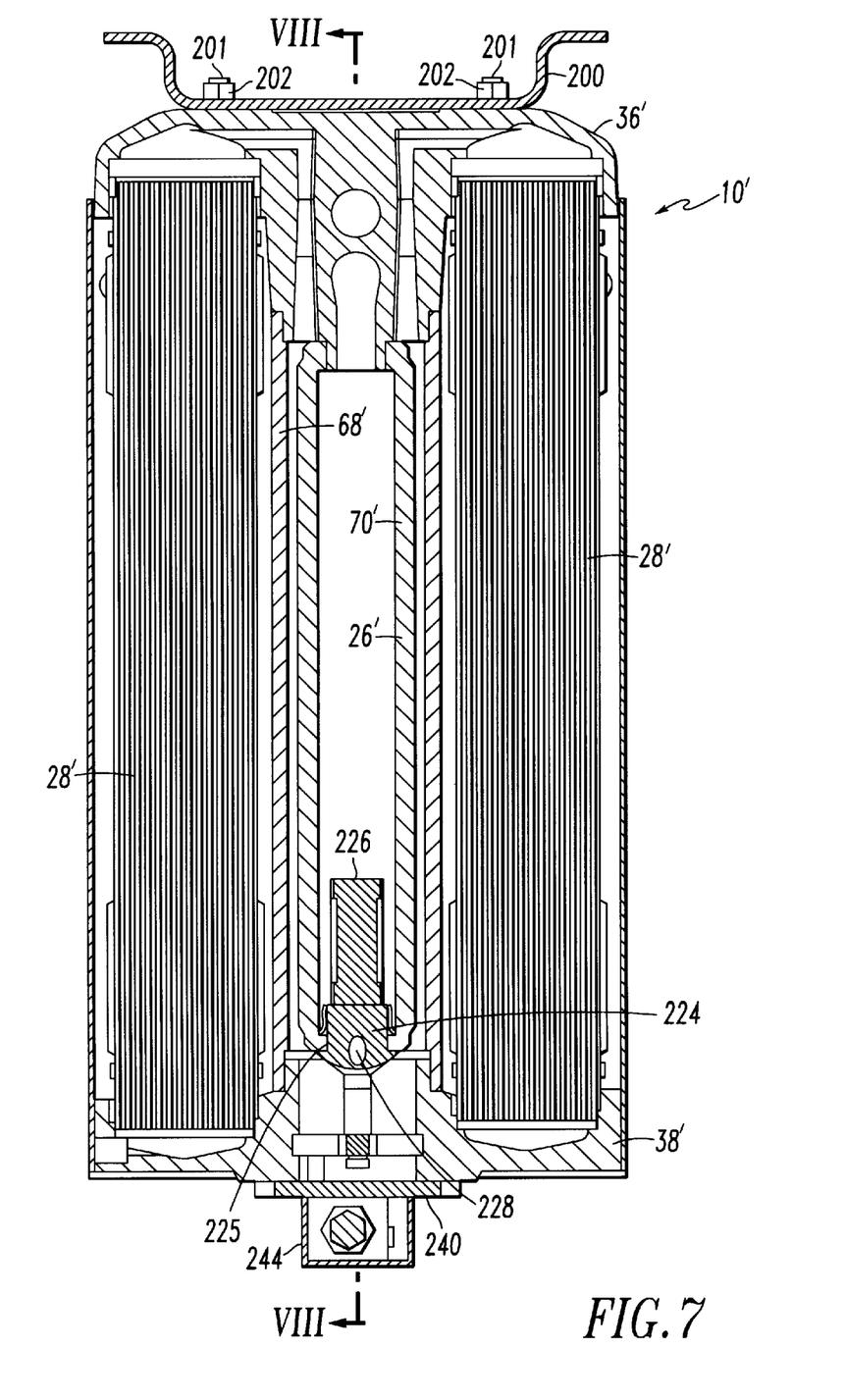
FIG. 7 is a sectional view taken generally on lines VII—VII of FIG. 11.

The dryer apparatus 10' of FIGS. 6–12 comprises upper and lower manifolds 36' and 38', respectively, membrane bundles or cartridges 28', and a filter assembly 26' including a filter element 70' enclosed within a compression tube 68', all essentially as described above with reference to the FIGS. 1–5 embodiment and shown in FIG. 7.

Figure 8:
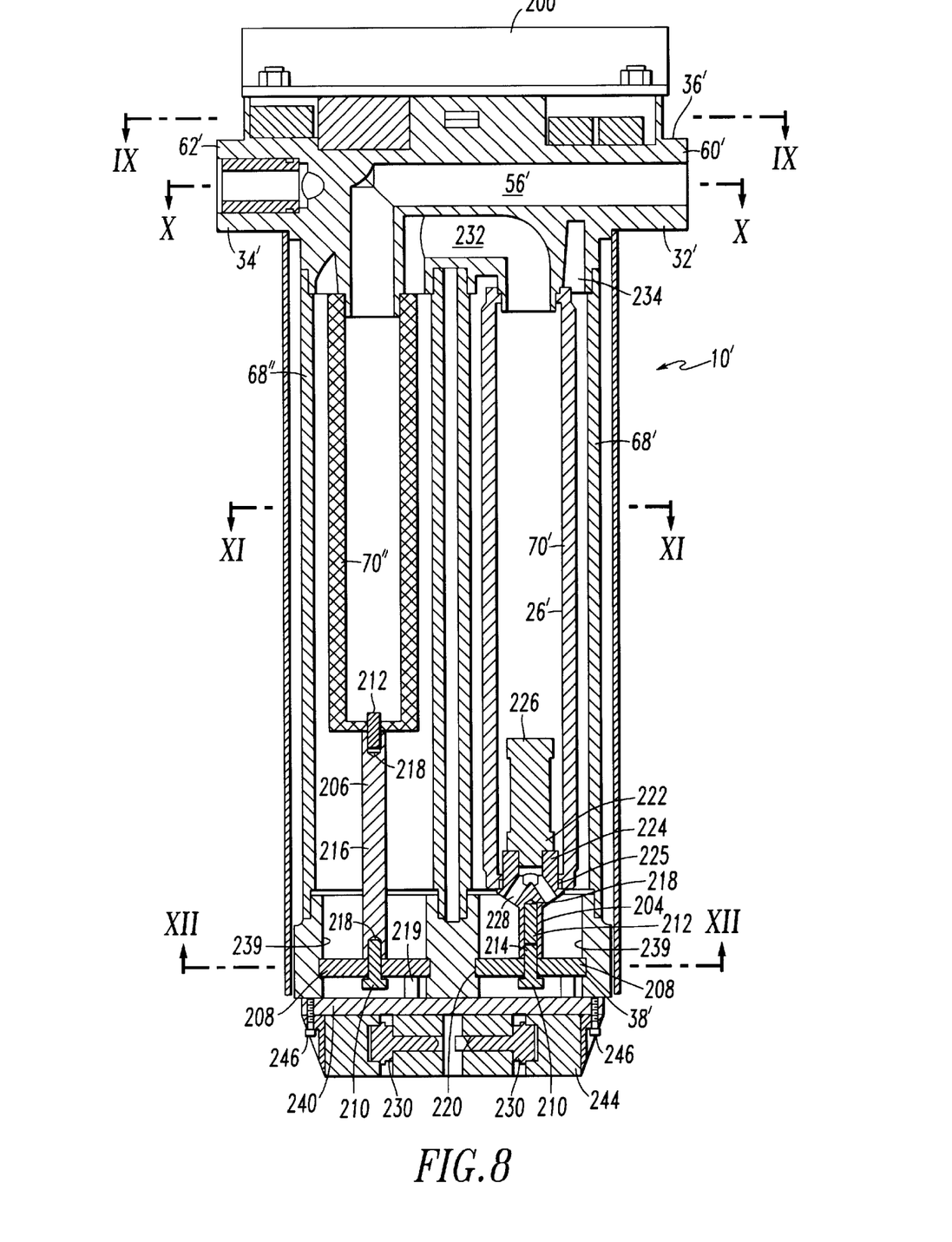
FIG. 8 is a sectional view taken on lines VIII—VIII of FIG. 7.

As shown in FIG. 8, upper manifold 36' of dryer apparatus 10' includes an inlet 32' and an outlet 34', with respective inlet and outlet connection flanges 60' and 62', as described above with reference to the FIGS. 1–5 embodiment. In addition, as shown in FIG. 8, filter assembly 26' is a dual element filter assembly comprised of first and second elongated, cylindrical filter elements 70' and 70", enclosed within respective compression tubes 68' and 68", and arranged in series so that compressed air entering the dryer 10' flows in sequence through element 70" first, and then through element 70'. Thus, the two filter elements are preferably different types of filters for different purposes. For example, filter element 70' may be a particulate and fines filter and element 70" may be a bulk liquid and gross particulates filter.

Figure 9:
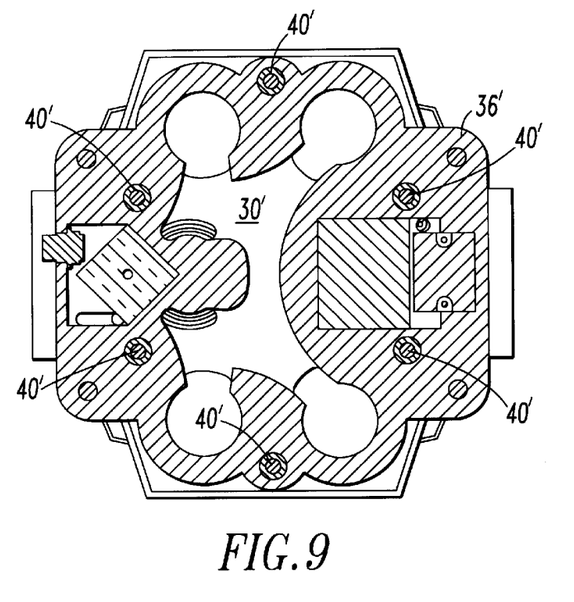
FIG. 9 is a sectional view taken on lines IX—IX of FIG. 8.

FIG. 9 is a transverse sectional view of upper manifold 36' showing passages 30' which communicate between the upper ends of the multiple membrane fiber cartridges 28', essentially as described above with reference to the FIGS. 1–5 embodiment.

Figure 10:
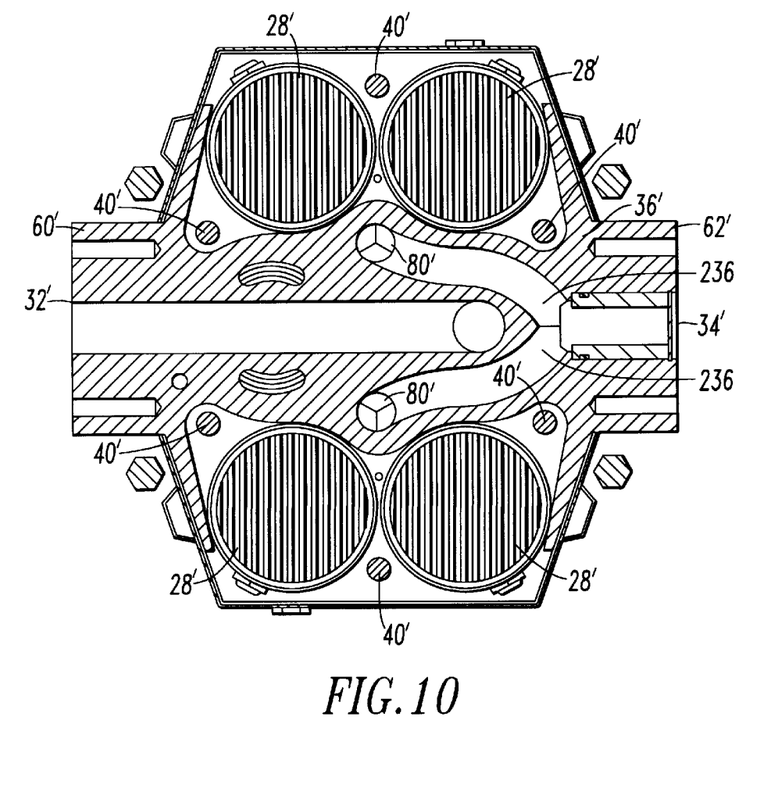
FIG. 10 is a sectional view taken on lines X—X of FIG. 8.

FIG. 10 is another transverse sectional view of upper manifold 36' showing the inlet and outlet flanges 60' and 62', respectively, and the respective associated inlet and outlet passages 32' and 34'. Also shown are tie rods 40', return pipe 80', and membrane fiber cartridges 28', all essentially as described above with reference to the FIGS. 1–5 embodiment.

Figure 11:
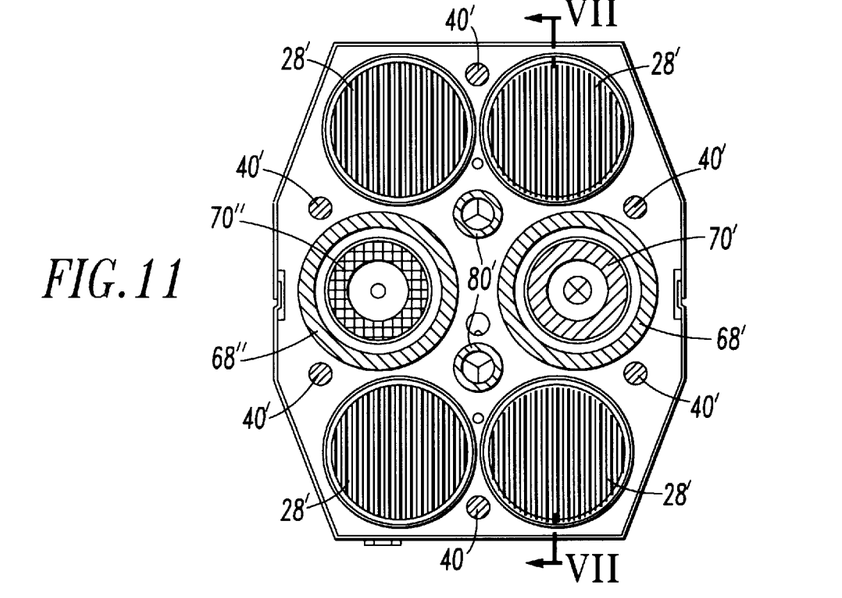
FIG. 11 is a sectional view taken on lines XI—XI of FIG. 8.

FIG. 11 is a transverse sectional view taken between manifolds 36' and 38', and showing membrane fiber cartridges 28', return pipes 80', tie rods 40', filter elements 70' and 70", and compression tubes 68' and 68", all essentially as described above with reference to the FIGS. 1–5 embodiment.

Figure 12:
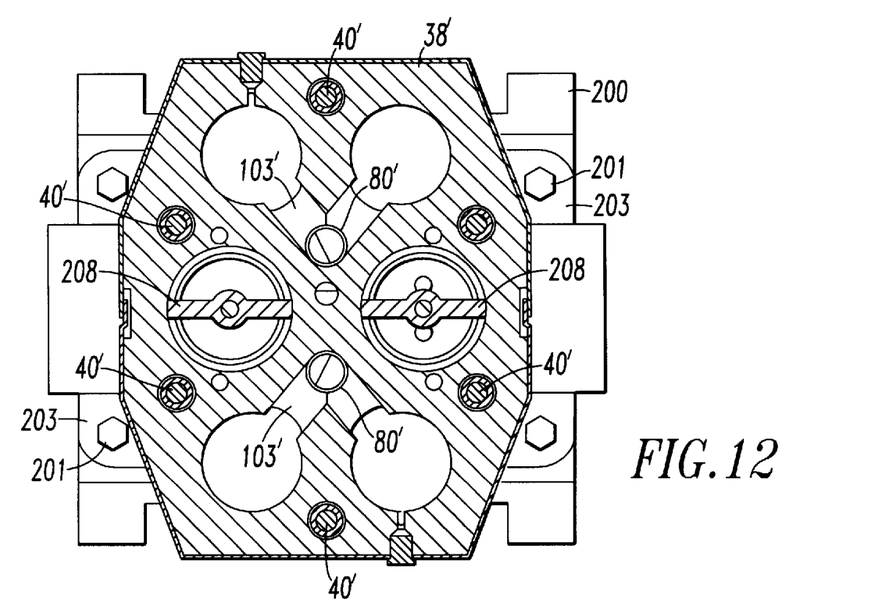
FIG. 12 is a sectional view taken on fines XII—XII of FIG. 8.

FIG. 12 is a transverse sectional view of lower manifold 38' showing tie rods 40' and passages 103' which communicate between the lower ends of the membrane fiber cartridges and the return pipes 80', all essentially as described above with reference to the FIGS. 1–5 embodiment.

The following additional features of the FIGS. 6–12 embodiment are to be noted. FIG. 6 shows a mounting bracket 200 fixed to upper manifold 36', for example by bolts 201 which pass through lugs 203 of manifold 36' and have nuts 202 threaded onto their upper ends to capture bracket 200. The bracket 200 may be of any suitable configuration for mounting the dryer 10' to a conventional locomotive.

FIG. 8 shows filter support assemblies 204 and 206, for supporting filter elements 70' and 70", respectively, within the dryer assembly. Each filter support assembly includes a T-handle 208, a bolt 210 engaged within a threaded bore formed in the T-handle 208, a cylindrical stud 212 fixed adjacent to and projecting coaxially downwardly from the lower end of each filter element 70' and 70" in coaxial alignment with the bolt 210, and a filter support rod extending between and engaging the coaxially aligned stud 212 and bolt 210. Since filter elements 70' and 70" need not be the same axial length, the length of the filter support rod will differ for different sizes of filter elements. For example, in the FIG. 8 embodiment filter element 70' is axially longer than filter element 70", and accordingly the filter support rod 214 supporting element 70' is correspondingly shorter than the rod 216 supporting element 70".

Each rod 214 and 216 is provided with axially extending recesses 218 at its opposed ends to receive, respectively, a stud 212 and a bolt 210. Accordingly, each filter element 70', 70" is supported by the respective rod 214, 216, engaging the corresponding stud 212 within the recess at its upper end, and the corresponding bolt 210 within the recess at its lower end.

To provide the requisite support for the filter elements, T-handles 208 fit into respective longitudinal machined slots 219 in lower manifold 38' until they engage a circumferential groove 220. Rotating the T-handle 208 in groove 220, away from slots 219, locks the T-handle 208 in place. Turning the bolt 210 to advance it into T-handle 208 acts through the respective support rod 204 or 206 to develop a compressive force between T-handle 208 and the respective filter element 70' or 70". The compressive force maintains the corresponding filter element in its installed position within the dryer assembly, and additionally maintains the T-handle 208 in engagement with groove 220. Of course, maintaining the T-handle 208 in groove 220 is of paramount importance, and to this end groove 220 may be provided with a detent to receive T-handle 208, thereby positively locking the T-handle 208 in place when the bolt 210 is tightened down. Thus, the engagement and retention structure for retaining the T-handles 208 in the dryer assembly may be similar in many respects to a bayonet type lock such as described above with reference to the FIGS. 1–5 embodiment.

FIGS. 7 and 8 show a pressure relief valve assembly 222 associated with filter element 70'. Either or both of the filter elements 70' and 70" may be provided with such a relief valve to provide a bypass flow path in the event the filter element becomes clogged. The bypass flow path provides for compressed air flow to pneumatic devices, upon development of sufficient pressure to open the pressure relief valve, when filter clogging would otherwise cut off the compressed air supply regardless of pressure.

As shown, the lower end of filter element 70' is open to receive a relief valve fitting 224, which is received therein in sealing engagement by means of an o-ring seal 225. In addition to the sealed engagement as described, fitting 224 may be provided with suitable engagement structure allowing it to snap fit onto filter element 70', whereby on removing the fitting 224 from the dryer assembly, the filter element 70' is drawn out of the dryer assembly with it, thus simplifying maintenance. Similarly, the described elements of each filter support assembly 204 and 206 may be suitably interengaged for assembly to the filter elements 70' and 70" as a unit, thereby permitting the filter elements and the respective support assemblies to be installed in and removed from the dryer assembly as a unit.

Fitting 224 carries a pressure relief valve 226, and includes flow passages 228 which communicate between relief valve 226 and the exterior of filter element 70'. Fitting 224 also incorporates the stud 212 for the purposes described above. The relief valve opens, when subjected to sufficient internal pressure within filter element 70', to thereby allow compressed air flow to bypass filter element 70' via flow passages 228. This will occur only when filter element 70' is sufficiently loaded with arrested particulates that air flow through the filter element is limited to a flow rate less than a prescribed minimum. The set pressure of the relief valve 226 is to be chosen accordingly.

T-handles 208 do not seal the openings 239 in manifold 38' into which they are inserted to install and retain filter elements 70' and 70". Hence, as shown in FIGS. 6 and 8, the openings 239 are closed and sealed by a plate 240 which overlies openings 239 in sealing engagement with the lower face 241 of manifold 38' and is retained by bolts 242. A cap 244 is secured to plate 240 by bolts 246. Cap 244 carries drain valves 230, shown in FIG. 8, which are selectively operated, by electrical or pneumatic means for example, to open for the purpose of draining condensate from the dryer assembly as needed and as described above with reference to the FIGS. 1–5 embodiment.

In operation, compressed air flow passes via inlet passage 56' in upper manifold 36' to filter 70". After filtering through filter element 70", the compressed air flows upwardly within compression tube 68" to a passage 232 in upper manifold 36', and thence into filter element 70'. The compressed air passes through filter element 70' and flows upwardly within compression tube 68' and via additional flow passages 234 in upper manifold 36' and thence to flow passages 30' for distribution to the membrane cartridges 28'. The dried compressed air exits cartridges 28' at the bottom thereof and flows via passages 103' in lower manifold 38' to return pipes 80'. Pipes 80', in turn, direct the compressed air flow to passages 236 in upper manifold 36', and the compressed air thence flow via the passages 236 to outlet 34'.

Water vapor extracted from the compressed air stream by the permeation process is vented from the fiber cartridges 28' via suitable vents (not shown) as described above with reference to the FIGS. 1–5 embodiment.

In addition to the above, the following are noteworthy design features of dryer 10 which contribute to its compactness and overall structural integrity. Manifolds 36–36' and 38–38' embody design features which enhance compactness by helping to minimize the overall axial length of the dryer apparatus. For example, the manifold sealing surfaces are stacked vertically to the extent possible in order to minimize the footprint required to accommodate all necessary O-ring seal glands. That is, by placing O-ring seal locations at different elevations in the respective manifolds, the O-ring gland locations can laterally overlap and thereby minimize the overall dryer apparatus footprint.

In manifold 36 for example, the membrane tube sealing surfaces are located at the highest possible elevation and other sealing surfaces are located at lower elevations. The benefit of this arrangement is twofold. First, it helps to minimize the overall axial length of the dryer assembly for any given membrane tube length. Second, the design permits greater freedom in locating other seal surfaces within the smallest possible footprint. Thus, the return tube O-ring gland 106 in manifold 36 is located at an elevation beneath the membrane tube O-ring glands, and the compression tube O-ring gland 108 is at a still lower elevation.

By making the compression tube O-ring gland 108 a male configuration which fits within compression tube 68, the structure accommodates the largest possible diameter compression tube with attendant benefits to overall structural strength of the assembly as described hereinbelow.

Another beneficial manifold design feature is the use of elliptical flow passages within the manifolds. This permits creation of sufficient cross sectional flow areas to support consistent flow velocities with low pressure drops in the lowest possible manifold profile. As shown for passages 98 in FIG. 5 for example, the minor axis of the elliptical passages is oriented vertically to minimize the vertical thickness of the manifold casting. This too contributes to savings in overall dryer assembly axial length. Similar flow passage design practice is applied in the lower manifold 38 as well.

These and other enhancements, modifications, and alternative embodiments would occur to others versed in the art, once they were apprised of our invention. Accordingly, it is our intention that the invention should be construed broadly and limited only by the scope of the claims appended hereto.

We claim:

1. An air processing apparatus comprising:
   a pair of manifolds disposed in spaced relationship;
   a rigid compression load bearing means engaging said manifolds and extending therebetween to establish a minimum spacing between said manifolds;
   tension load bearing means which is cooperable with said manifolds to maintain said manifolds at said minimum spacing in compressive engagement with said compression means;
   plural air conveying means extending between and engaging said manifolds, with at least some of said air conveying means engaging said manifolds in sealed but essentially non-load bearing engagement;

said at least some of said air conveying means including air processing means which are operable to process a stream of air passed therethrough from one of said manifolds to the other;

at least one of said manifolds including air inlet and outlet means for receiving air to be processed into said processing apparatus and for passing processed air from said processing apparatus; and said manifolds including portions of a flow passage means for directing air from said inlet means through said air processing means and to said outlet means.

2. The apparatus as set forth in claim 1 wherein said compression means includes an elongated enclosure means having an interior space extending intermediate said manifolds which forms another portion of said flow passage means.

3. The apparatus as set forth in claim 2 wherein said interior space additionally forms a condensate collection chamber.

4. The apparatus as set forth in claim 3 additionally including condensate drain valve means which is cooperable with said condensate collection chamber for draining condensate from said interior space.

5. The apparatus as set forth in claim 2 additionally including filter means disposed within said interior space of said elongated enclosure means for filtering the air which passes therethrough.

6. The apparatus as set forth in claim 5 wherein the portion of said flow passage means in one of said manifolds includes passage means for directing air from said inlet means to said filter means and the other of said manifolds includes access means for providing external access to said filter means.

7. The apparatus as set forth in claim 6 wherein said access means includes an opening in said other of said manifolds and said filter means includes a cap means which is cooperable with said opening for selective opening and closing thereof.

8. The apparatus as set forth in claim 1 wherein said air processing means includes plural elongated permeable membrane assemblies which extend between and engage said manifolds and are operable to extract moisture from air passed therethrough.

9. The apparatus as set forth in claim 1 wherein only one of said manifolds includes said air inlet and outlet means, and the other of said manifolds includes a portion of said flow passage means for directing air flow from said air processing means to one of said air conveying means for flow therethrough to said outlet means.

10. An apparatus for processing air comprising:

a first manifold having an air inlet and an air outlet;

a second manifold disposed in spaced relationship to said first manifold;

elongated enclosure means extending between said first and second manifolds to define an enclosed space therebetween;

a plurality of elongated air processing means extending between said first and second manifolds and operable to process air passed therethrough between said manifolds in a first flow direction;

a return passage means for directing air flow between said first and second manifolds in the flow direction opposing said first flow direction of air flowing through said air processing means;

said first manifold including first flow passage means for directing air flow from said inlet to said enclosed space, second flow passage means for directing air flow from said enclosed space to said air processing means, and third flow passage means for directing air flow from said return passage means to said outlet; and said second manifold including fourth flow passage means for directing air flow from said air processing means to said return passage means.

11. The apparatus as set forth in claim 10 additionally including filter means disposed in said enclosed space.

12. The apparatus as set forth in claim 11 wherein said first flow passage means directs air flow in said first flow direction into said filter.

13. The apparatus as set forth in claim 12 wherein said second flow passage means is disposed to receive air flowing from said filter in said second flow direction.

14. The apparatus as set forth in claim 10 wherein said plurality of elongated air processing means includes plural elongated permeable membrane assemblies which extend between and engage said manifolds and are operable to extract moisture from air passed therethrough.

15. The apparatus as set forth in claim 10 additionally including plural tie rods which are cooperable with said first and second manifolds to maintain said first and second manifolds in compressive engagement with said elongated enclosure means.

\* \* \* \* \*